(12) United States Patent
Tokutomi et al.

(10) Patent No.: US 9,096,448 B2
(45) Date of Patent: Aug. 4, 2015

(54) ANAEROBIC TREATMENT METHOD AND APPARATUS

(75) Inventors: Takaaki Tokutomi, Tokyo (JP); Hideaki Shinto, Tokyo (JP)

(73) Assignee: KURITA WATER INDUSTRIES LTD., Tokyo (JP)

(*) Notice: Subject to any disclaimer, the term of this patent is extended or adjusted under 35 U.S.C. 154(b) by 266 days.

(21) Appl. No.: 13/885,946

(22) PCT Filed: Nov. 17, 2011

(86) PCT No.: PCT/JP2011/076488
§ 371 (c)(1),
(2), (4) Date: May 16, 2013

(87) PCT Pub. No.: WO2012/070459
PCT Pub. Date: May 31, 2012

(65) Prior Publication Data
US 2013/0233793 A1    Sep. 12, 2013

(30) Foreign Application Priority Data

Nov. 24, 2010  (JP) .................................. 2010-261349
Nov. 24, 2010  (JP) .................................. 2010-261353
Nov. 25, 2010  (JP) .................................. 2010-262504

(51) Int. Cl.
C02F 3/28    (2006.01)
C02F 3/10    (2006.01)
(Continued)

(52) U.S. Cl.
CPC ............... *C02F 3/2833* (2013.01); *C02F 3/108* (2013.01); *C02F 1/66* (2013.01); *C02F 2103/32* (2013.01); *C02F 2209/06* (2013.01); *C02F 2303/16* (2013.01); *Y02E 50/343* (2013.01)

(58) Field of Classification Search
CPC .... C02F 3/2833; C02F 3/108; C02F 2103/32; C02F 2303/16; C02F 1/66; C02F 2209/06; Y02E 50/343

USPC ......... 210/603, 615, 616, 617, 618, 252, 259, 210/260
See application file for complete search history.

(56) References Cited

U.S. PATENT DOCUMENTS 5,454,949 A * 10/1995  Davis et al. ................... 210/617
5,783,066 A    7/1998  Aylmore
(Continued)

FOREIGN PATENT DOCUMENTS

JP    S61-021789 A    1/1986
JP    H02-138960 A    5/1990
(Continued)

OTHER PUBLICATIONS

China Patent Office, "Office Action for CN 201180056761.3," Jun. 12, 2014.
(Continued)

*Primary Examiner* — Fred Prince
(74) *Attorney, Agent, or Firm* — Manabu Kanesaka (57) ABSTRACT

Anaerobic treatment of water is performed under anaerobic conditions with a biofilm formed on a surface of a fluid non-biological carrier in a reaction vessel. Stable high-load treatment is performed by preventing the blockage of the reaction vessel caused by the flotation and adhesion of the non-biological carrier in the reaction vessel and effectively recovering the settleability of the carrier floating owing to adhering air bubbles by simple means. A reaction vessel is charged with a fluid non-biological carrier having a size in the range of 1.0 to 5.0 mm and a settling velocity in the range of 200 to 500 m/h. Part of the carrier that has floated and flowed out of the reaction vessel is fed downward through a pipe having a vertical height of 50 cm or more so as to remove air bubbles adhering to the carrier and is returned to the reaction vessel.

18 Claims, 3 Drawing Sheets

(51) Int. Cl.
  *C02F 103/32* (2006.01)
  *C02F 1/66* (2006.01)

(56) References Cited

U.S. PATENT DOCUMENTS

| | | | |
|---|---|---|---|
| 5,962,309 A | 10/1999 | Kumagai et al. | |
| 2009/0258404 A1* | 10/2009 | Mikkelsen et al. | 435/139 |

FOREIGN PATENT DOCUMENTS

| | | | |
|---|---|---|---|
| JP | H02-203993 A | 8/1990 |
| JP | H03-109998 A | 5/1991 |
| JP | H04-330995 A | 11/1992 |
| JP | H06-142682 A | 5/1994 |
| JP | H06-67511 A | 8/1994 |
| JP | H07-039896 A | 2/1995 |
| JP | H08-502937 A | 4/1996 |
| JP | H08-117777 A | 5/1996 |
| JP | H09-075982 A | 3/1997 |
| JP | H09-248591 A | 9/1997 |
| JP | H10-015582 A | 1/1998 |
| JP | H10-216784 A | 8/1998 |
| JP | H10-257885 A | 9/1998 |
| JP | H11-128979 A | 5/1999 |
| JP | H11-165189 A | 6/1999 |
| JP | 2002-051771 A | 2/2002 |
| JP | 2002-172399 A | 6/2002 |
| JP | 2003-062594 A | 3/2003 |
| JP | 2006-082053 A | 3/2006 |
| JP | 2006-110424 A | 4/2006 |
| JP | 2009-066592 A | 4/2009 |

OTHER PUBLICATIONS

Zheng, X. et al., "Chemical Unit Operation," Oct. 31, 2010, Science Press, Beijing, China.

Japan Patent Office, "Office Action for JP 2010-261349," Oct. 14, 2014.

Japan Patent Office, "Office Action for JP 2010-261353," Oct. 14, 2014.

Japan Patent Office, "Office Action for JP 2010-262504," Oct. 14, 2014.

* cited by examiner

ANAEROBIC TREATMENT METHOD AND APPARATUS

FIELD OF INVENTION

The present invention relates to an anaerobic treatment method and apparatus in which water to be treated is fed under anaerobic conditions over a biofilm formed on a surface of a fluid non-biological carrier in a reaction vessel.

The present invention relates to a method for treating organic wastewater and more particularly to a method for biologically treating wastewater containing an organic substance with an anaerobic microorganism adhering to a non-biological carrier in a reaction vessel, wherein the adhesion of the microorganism to the carrier is promoted at the startup to facilitate the formation of an active biofilm on the carrier surface, thereby significantly reducing the startup time of the apparatus and efficiently treating the organic wastewater even after the startup of the apparatus.

BACKGROUND OF INVENTION

One known anaerobic treatment method for organic wastewater is an upflow anaerobic sludge blanket (UASB) method, in which organic wastewater containing soluble BOD is subjected to high-load high-speed treatment by passing the organic wastewater through a sludge blanket of high-density settling granular sludge in a reaction vessel. In this method, a solid organic substance having a low digestion rate is treated separately, and only a soluble organic substance having a high digestion rate is subjected to high-load high-speed anaerobic treatment using granular sludge having a high anaerobic microorganism density. An expanded granular sludge blanket (EGSB) method is also known as an improved UASB method. In this method, wastewater is subjected to high-load anaerobic treatment at a high flow rate through a wide-spreading sludge blanket in a tall reaction vessel.

In anaerobic treatment using granular sludge, such as the UASB method or the EGSB method, granular sludge containing an anaerobic microorganism is grown. These methods can have a higher sludge concentration than a fixed bed or a fluidized bed, which contains sludge on a carrier, and can be used in high-load operation. These methods can be started up within a short time by obtaining surplus sludge from a treatment system in operation. Thus, these methods are among the most efficient anaerobic treatment methods.

These methods using granular sludge are very efficient when the COD concentration of wastewater is high ($COD_{Cr}$ concentration of approximately 2000 mg/L or more). When the COD concentration is low ($COD_{Cr}$ concentration of approximately 2000 mg/L or less), however, a large amount of water must be supplied to a reaction vessel, making granules to easily wash out from the reaction vessel. This tends to result in unstable performance.

When wastewater in which granules are difficult to form is treated by these methods, initial granules gradually decompose, and operation cannot be continued.

In contrast, in a method using a fluid non-biological carrier, the outflow of the carrier from a reaction vessel can be prevented by a mechanical method, such as a screen. Furthermore, the carrier surface can always serve as a growing medium for a microorganism. Thus, a method using a fluid non-biological carrier can advantageously be applied to wastewater of a low concentration COD or wastewater in which granules are likely to decompose.

A non-biological carrier has a high degree of freedom of design, such as specific density or size, and allows a much higher settling velocity than granules. Use of a non-biological carrier having a high settling velocity can obviate the necessity for a solid-liquid separation mechanism (GSS), which is required for granule methods, increase the effective volume of a reaction vessel, and significantly reduce construction costs.

In a method using a fluid non-biological carrier, however, a microorganism adheres to a carrier to form a biofilm on the carrier surface and generates gas within the biofilm. The gas adheres to the carrier. This reduces the apparent specific density of the carrier and floats the carrier in a reaction vessel, and the carrier flows out of the reaction vessel together with treated water. Such a problem can be solved by using a carrier having a large specific gravity and a high settling velocity. However, an anaerobic treatment method using a carrier having an excessively large specific gravity and an excessively high settling velocity has low contact efficiency between the carrier and water to be treated and low treatment efficiency. Furthermore, a solid deposited on a layer of settled carrier can block the flow path.

In one proposed method to prevent the flotation of a carrier, a reaction vessel is agitated with impeller blades to remove air bubbles from the carrier using a swirl flow, thereby recovering the settleability of the carrier. However, the carrier may be broken by a collision with the impeller blades.

Patent Documents 1 and 2 describe an apparatus for extracting a floating carrier from a reaction vessel and returning the carrier to the reaction vessel through an external circulation line.

Air bubbles adhering to the floating carrier extracted from the reaction vessel can be removed while the carrier returns to the reaction vessel through the circulation line. However, the present inventors found that only the circulation of a carrier without consideration of the settleability of the carrier cannot solve the problems of the flotation and adhesion of the carrier in a reaction vessel. Furthermore, since not much consideration has been given to the relationship between the settleability of a carrier and circulation means, the circulation requires a complicated mechanism and high maintenance costs. For example, Patent Document 1 describes a complicated collection and reflux line and a liquid jet mechanism for the circulation of a carrier. Such a mechanism cannot be easily attached to an existing reaction vessel, is likely to break down, and requires complicated maintenance. Patent Document 2 describes an ejector mechanism in a circulation line of a carrier. Such a mechanism also has similar problems.

Various fluid non-biological carriers are used in such treatment. For example, Patent Document 3 describes use of a carrier having a particle size in the range of 0.1 to 0.3 mm and a specific gravity in the range of approximately 1 to 3. Patent Document 4 describes use of granular organic gel fine particles having a particle size in the range of 0.5 to 0.6 mm as a carrier. The gel fine particles swollen with water have a specific density in the range of 1.00 to 1.50, preferably 1.01 to 1.10. The settling velocity of the gel fine particles in connection with the present invention may be in the range of 15 to 150 m/h.

Patent Document 5 describes "a fluid treatment carrier, comprising a foam containing a polyolefin resin constituting 30% to 95% by weight and a hydrophilizing agent of a cellulose powder constituting 5% to 70% by weight, the foam having surface melt fracture" and "a fluid treatment carrier, comprising a foam containing a polyolefin resin constituting 30% to 95% by weight, a hydrophilizing agent of a cellulose powder constituting 4% to 69% by weight, and an inorganic powder constituting 1% to 30% by weight, the foam having surface melt fracture" as fluid treatment carriers of a polyolefin foam having excellent fluid treatment performance, such as settleability in water. Patent Document 5 also describes denitrification treatment evaluation results using the fluid treatment carriers. However, the size and the settling velocity of the carriers are not clear, and a specific treatment method is not described.

In anaerobic treatment using a fluid non-biological carrier, a low settling velocity of the carrier results in poor settleability and the flotation and outflow of the carrier after the formation of a biofilm on the carrier surface. On the other hand, a high settling velocity of the carrier results in poor flowability and adhesion and blockage due to a grown biofilm, making the operation impossible.

The surface properties of a carrier greatly affect the number of microorganisms adhering to the carrier and the treatment capacity of a reaction vessel. A decrease in the number of microorganisms adhering to the carrier to maintain settleability results in a low treatment capacity. On the other hand, when a microorganism can grow to the inside of the carrier in order to increase the number of microorganisms adhering to the carrier, the biofilm becomes thick, and the carrier floats because of air bubbles formed within the carrier.

UASB and EGSB using granules are principally applied to high-concentration wastewater and are generally not applied to low-concentration wastewater having a $COD_{Cr}$ concentration of approximately 2000 mg/L or less. This is because granules may wash out of a reaction vessel, and the outflow of granules in low-concentration wastewater often exceeds the number of granules grown in the reaction vessel, making it difficult to hold the granules in the reaction vessel for a long period of time.

A method using a fixed bed or fluidized bed carrier rather than granules has been applied to low-concentration wastewater. In the case of the fixed bed carrier, a support bed for holding a biofilm is fixed in a reaction vessel, and a microorganism grown on the surface of the support bed is used. In the case of the fluidized bed carrier, a carrier having a controlled specific density and size is fluidized in a reaction vessel, and a biofilm formed on the carrier surface is used for treatment.

Irrespective of fixed bed carriers or fluidized bed carriers, use of non-biological carriers disadvantageously takes time for a microorganism to adhere to the carriers and takes considerable time to start up apparatuses. Hitherto, in the startup of an apparatus, a reaction vessel containing a carrier has been charged with dispersed seed sludge, and the flow of water has been limited in order to prevent the outflow of the seed sludge. Normal operation is started after a biofilm is formed on the carrier surface. As described below in Comparative Example 1, however, such procedures take a long time of 90 days before the startup of the apparatus.

Patent Document 6 proposes a mix-bed reaction vessel of a carrier and granules. The reaction vessel described in Patent Document 6 always includes a mix-bed of the carrier and the granules and must operate under limited conditions where the granules in the reaction vessel are not dispersed.

Patent Document 7 discloses that sludge flowing out of a reaction vessel during the startup of an apparatus in treatment by the UASB method is adsorbed on a carrier in a carrier column vessel installed downstream from the reaction vessel and is returned to the reaction vessel. However, this is not intended to promote the adhesion of a microorganism to a carrier in the reaction vessel during the startup of the apparatus.

Patent Document 8 discloses that water-absorbing polymer hydrogel particles in a blanket in treatment by the UASB method promotes the formation of granules during the startup. This method is also not intended to promote the adhesion of a microorganism to a carrier in a method using a fixed bed or fluidized bed carrier.

As described in an example of Patent Document 9, granular sludge obtained from an UASB reaction vessel of another system is supplied as seed sludge at the startup of a reaction vessel in the UASB method. In a method using a fixed bed or fluidized bed carrier, however, granular sludge is not supplied at the startup of a reaction vessel.

LIST OF DOCUMENTS

Patent Documents

Patent Document 1: Japanese Patent Publication H8-117777A
Patent Document 2: Japanese Patent Publication H2-138960A
Patent Document 3: Japanese Patent Publication H6-67511A
Patent Document 4: Japanese Patent Publication 2003-62594A
Patent Document 5: Japanese Patent Publication 2009-66592A
Patent Document 6: Japanese Patent Publication H9-75982A
Patent Document 7: Japanese Patent Publication H3-109998A
Patent Document 8: Japanese Patent Publication H7-39896A
Patent Document 9: Japanese Patent Publication 2002-172399A

OBJECT AND SUMMARY OF INVENTION

A first invention aims to solve the problems described above. In anaerobic treatment of water under anaerobic conditions with a biofilm formed on a surface of a fluid non-biological carrier in a reaction vessel, the first invention provides an anaerobic treatment method and apparatus to realize stable high-load treatment by preventing blockage caused by the flotation and adhesion of the non-biological carrier in the reaction vessel and effectively recovering the settleability of the carrier floating owing to adhering air bubbles by simple means.

As a result of repeated investigations to solve the problems described above, the present inventors found that use of a fluid non-biological carrier having a particular size and settling velocity can prevent blockage caused by the flotation and adhesion of the carrier and allows the settleability of the carrier floating owing to adhering air bubbles to be easily recovered by simple means.

The first invention has been achieved on the basis of such findings and is summarized as follows:

[1] An anaerobic treatment method, including: supplying water to be treated to a reaction vessel charged with a fluid non-biological carrier under anaerobic conditions to form a biofilm on a surface of the non-biological carrier, thereby treating the water to be treated, wherein the reaction vessel is charged with a non-biological carrier having a size in the range of 1.0 to 5.0 mm and a settling velocity in the range of 200 to 500 m/h, and the carrier contained in treated water flowing out of the reaction vessel is returned to the reaction vessel after air bubbles adhering to the carrier are removed.

[2] The anaerobic treatment method according to [1], wherein treated water containing the carrier flowing out of the reaction vessel is fed downward through a pipe having a vertical height of 50 cm or more so as to remove air bubbles adhering to the carrier.

[3] The anaerobic treatment method according to [1] or [2], wherein the carrier from which the air bubbles have been removed is separated from treated water with a screen or a settling tank and is returned to the reaction vessel through a pump.

[4] An anaerobic treatment apparatus for supplying water to be treated to a reaction vessel charged with a fluid non-biological carrier under anaerobic conditions to form a biofilm on a surface of the non-biological carrier, thereby treating the water to be treated, wherein the carrier charged into the reaction vessel has a size in the range of 1.0 to 5.0 mm and a settling velocity in the range of 200 to 500 m/h, and the anaerobic treatment apparatus has means for removing air bubbles adhering to the carrier contained in treated water flowing out of the reaction vessel and means for returning the carrier to the reaction vessel after the air bubbles have been removed.

[5] The anaerobic treatment apparatus according to [4], wherein the means for removing air bubbles adhering to the carrier is a pipe having a vertical height of 50 cm or more through which treated water containing the carrier flowing out of the reaction vessel flows downward.

[6] The anaerobic treatment apparatus according to [4] or [5], wherein the means for returning the carrier to the reaction vessel after the air bubbles have been removed includes a screen or a settling tank for separating treated water from the carrier from which the air bubbles have been removed and a pump for returning the carrier that has passed through the screen or the settling tank to the reaction vessel.

The first invention provides anaerobic treatment of water under anaerobic conditions with a biofilm formed on a surface of a fluid non-biological carrier in a reaction vessel, wherein stable high-load treatment is performed by preventing blockage caused by the flotation and adhesion of the non-biological carrier in the reaction vessel and effectively recovering the settleability of the carrier floating owing to adhering air bubbles by simple means.

As a result of repeated investigations to solve the problems described above, the present inventors found that use of a fluid non-biological carrier made of a resin foam having surface melt fracture and a particular size and settling velocity allows a sufficient number of microorganisms to adhere to the carrier, can prevent blockage due to the flotation, outflow, and adhesion of the carrier, and allows a satisfactory fluidized bed to be formed, thereby allowing stable efficient anaerobic treatment.

The second invention has been achieved on the basis of such findings and is summarized as follows:

[i] An anaerobic treatment method, including: supplying water to be treated to a reaction vessel charged with a fluid non-biological carrier under anaerobic conditions to form a biofilm on a surface of the non-biological carrier, thereby treating the water to be treated, wherein the non-biological carrier is formed of the following foam (I) and/or (II), and the carrier has a size in the range of 1.0 to 5.0 mm and a settling velocity in the range of 200 to 500 m/h:

(I) a foam containing a resin component mainly composed of a polyolefin resin and a hydrophilizing agent of a cellulose powder, the resin component constituting 30% to 95% by weight of the foam, the hydrophilizing agent constituting 5% to 70% by weight of the foam, the foam having surface melt fracture, and (II) a foam containing a resin component mainly composed of a polyolefin resin, a hydrophilizing agent of a cellulose powder, and an inorganic powder, the resin component constituting 30% to 95% by weight of the foam, the hydrophilizing agent constituting 4% to 69% by weight of the foam, the inorganic powder constituting 1% to 30% by weight of the foam, the foam having surface melt fracture.

[ii] The anaerobic treatment method according to [i], wherein the surface melt fracture of the foam has a specific surface area ratio represented by the following formula (1):

$$B/A = 1.5 \text{ to } 4.0 \quad (1)$$

wherein A denotes the apparent specific surface area of the foam, and B denotes the actual specific surface area of the foam.

[iii] The anaerobic treatment method according to [i] or [ii], wherein the hydrophilizing agent is exposed on or protrudes from a surface of the foam.

[iv] The anaerobic treatment method according to any one of [i] to [iii], wherein the resin component has a melt flow index in the range of 5 to 25 g/10 min.

[v] The anaerobic treatment method according to [iv], wherein the resin component is polyethylene or a mixture of polyethylene and one or two or more selected from the group consisting of polypropylene, polystyrene, and ethylene-vinyl acetate copolymers.

[vi] The anaerobic treatment method according to any one of [i] to [v], wherein the foam has an expansion ratio in the range of 2 to 10 and a specific density in the range of 0.10 to 0.80 g/ml as determined from apparent volume.

[vii] The anaerobic treatment method according to any one of [i] to [vi], wherein the reaction vessel is an upflow reaction vessel.

[viii] An anaerobic treatment apparatus for supplying water to be treated to a reaction vessel charged with a fluid non-biological carrier under anaerobic conditions to form a biofilm on a surface of the non-biological carrier, thereby treating the water to be treated, wherein the non-biological carrier is formed of the following foam (I) and/or (II), and the carrier has a size in the range of 1.0 to 5.0 mm and a settling velocity in the range of 200 to 500 m/h:

(I) a foam containing a resin component mainly composed of a polyolefin resin and a hydrophilizing agent of a cellulose powder, the resin component constituting 30% to 95% by weight of the foam, the hydrophilizing agent constituting 5% to 70% by weight of the foam, the foam having surface melt fracture, and (II) a foam containing a resin component mainly composed of a polyolefin resin, a hydrophilizing agent of a cellulose powder, and an inorganic powder, the resin component constituting 30% to 95% by weight of the foam, the hydrophilizing agent constituting 4% to 69% by weight of the foam, the inorganic powder constituting 1% to 30% by weight of the foam, the foam having surface melt fracture.

In accordance with the second invention, a reaction vessel is charged with a fluid non-biological carrier, and water to be treated is fed under anaerobic conditions over a biofilm formed on a surface of the non-biological carrier to perform anaerobic treatment. The fluid non-biological carrier has a particular size and settling velocity. This allows a sufficient number of microorganisms to adhere to the carrier, can prevent blockage due to the flotation, outflow, and adhesion of the carrier, and allows a satisfactory fluidized bed to be formed, thereby allowing stable efficient anaerobic treatment.

A third invention provides a method for biologically treating wastewater containing an organic substance with an anaerobic microorganism adhering to a non-biological carrier in a reaction vessel, wherein the adhesion of the microorganism to the carrier is promoted at the startup to facilitate the formation of an active biofilm on the carrier surface, thereby significantly reducing the startup time of the apparatus and efficiently treating the organic wastewater even after the startup of the apparatus.

As a result of repeated investigations to solve the problems described above, the present inventors found that the problems described above can be solved by supplying a reaction vessel containing a non-biological carrier with methanogen granules as seed sludge at the startup of the reaction vessel at a predetermined ratio of the methanogen granules to the non-biological carrier, thereby allowing the methanogen granules to exist in the reaction vessel only in the early stages of the startup, and then by operating the reaction vessel under conditions where the methanogen granules are decomposed and dispersed.

The third invention has been achieved on the basis of such findings and is summarized as follows:

<1> A method for treating organic wastewater, including: supplying wastewater containing an organic substance to a reaction vessel containing a non-biological carrier to biologically treat the wastewater with an anaerobic microorganism adhering to the non-biological carrier, wherein at the startup of the reaction vessel the organic wastewater begins to be supplied to the reaction vessel containing the non-biological carrier and methanogen granules, the volume ratio of the non-biological carrier to the methanogen granules being in the range of 100:5 to 100:500, and the organic wastewater is continuously supplied to decompose and disperse at least some of the methanogen granules in the reaction vessel.

<2> The method for treating organic wastewater according to <1>, wherein the organic wastewater has an organic substance concentration of 2000 mg-$COD_{Cr}$/L or less.

<3> The method for treating organic wastewater according to <1> or <2>, wherein the reaction vessel is a fluidized bed reaction vessel, and the organic wastewater is fed upward to the reaction vessel.

<4> The method for treating organic wastewater according to any one of <1> to <3>, wherein the reaction vessel has a sludge loading in the range of 0.8 to 3.0 kg-$COD_{Cr}$/kg-VSS/day.

The third invention provides a method for biologically treating wastewater containing an organic substance with an anaerobic microorganism adhering to a non-biological carrier in a reaction vessel, wherein the adhesion of the microorganism to the carrier is promoted at the startup to facilitate the formation of an active biofilm on the carrier surface, thereby significantly reducing the startup time of the apparatus and efficiently treating the organic wastewater even after the startup of the apparatus.

As the organic wastewater is continuously supplied to the reaction vessel, the methanogen granules supplied to the reaction vessel at the startup of the reaction vessel gradually grow or decompose and flow out of the reaction vessel after flotation, dispersion, and/or decomposition. In the early stages of the startup, the methanogen granules contribute to the decomposition of COD components in the organic wastewater and, as seed sludge, promote the adhesion of the microorganism to the carrier surface.

Thus, in the early stages of the startup in which the microorganism insufficiently adheres to the carrier surface, methanogen granules themselves decompose the COD components of the organic wastewater. After the adhesion of the microorganism to the carrier surface is promoted, and the carrier surface is loaded with a sufficient number of microorganisms, even when the methanogen granules flow out of the reaction vessel after decomposition and/or dispersion of the methanogen granules, the microorganism-loaded carrier can decompose the COD components.

Since the treatment according to the third invention relies on the carrier rather than the granules, it is not necessary to operate the reaction vessel under conditions where the methanogen granules do not flow out of the reaction vessel over time after decomposition and/or dispersion. Thus, high-load operation is possible.

Thus, the present invention can significantly reduce the startup time of an apparatus and perform efficient treatment after the startup of the apparatus.

DESCRIPTION OF EMBODIMENTS

Embodiments of the first and second inventions will be described in detail below.

The first invention includes supplying water to be treated to a reaction vessel charged with a fluid non-biological carrier under anaerobic conditions to form a biofilm on a surface of the non-biological carrier, thereby anaerobically treating the water to be treated. The carrier has a size in the range of 1.0 to 5.0 mm and a settling velocity in the range of 200 to 500 m/h. After removing air bubbles adhering to the carrier floating in the reaction vessel and flowing out of the reaction vessel together with treated water, the carrier is returned to the reaction vessel.

The second invention includes supplying water to be treated to a reaction vessel charged with a fluid non-biological carrier under anaerobic conditions to form a biofilm on a surface of the non-biological carrier, thereby treating the water to be treated. The fluid non-biological carrier has a size in the range of 1.0 to 5.0 mm and a settling velocity in the range of 200 to 500 m/h.

The fluid non-biological carriers for use in the first and second inventions will be described below.

The fluid non-biological carriers for use in the first and second inventions have a size in the range of 1.0 to 5.0 mm and a settling velocity in the range of 200 to 500 m/h. The size and the settling velocity of a carrier refers to the size and the settling velocity of the carrier to be charged into a reaction vessel without a microorganism or air bubbles.

An excessively large size of the carrier results in a small surface area per volume of the reaction vessel. An excessively small size of the carrier results in a low settling velocity, making it difficult to separate the carrier from treated water. The carriers for use in the first and second inventions preferably have a size in the range of 2.5 to 4.0 mm.

The size of a carrier is generally referred to as a "particle size". For example, the size of a rectangular parallelepiped carrier refers to the length of the long side of the carrier. The size of a cubic carrier refers to the length of one side. The size of a cylindrical carrier refers to the larger one of the diameter and the height of the cylinder. The size of a carrier of an irregular shape other than these shapes refers to the largest distance between two parallel plates disposed on the top and bottom of the carrier.

In the first and second inventions, the carrier may have an average size in the range of 1.0 to 5.0 mm, preferably 2.5 to 4.0 mm. Part of the carrier may have a size outside this range.

The settling velocity of a carrier is calculated by immersing the carrier in water (clear water, such as tap water), collecting a sunken portion of the carrier, putting the portion of the carrier into water (clear water, such as tap water) in a graduated cylinder, and measuring the settling distance per unit time. In the present invention, the settling velocity refers to an average settling velocity of 10 to 20 carrier particles.

The carriers for use in the first and second inventions may be composed of any material(s), provided that the carriers have a size and a settling velocity in the ranges described above. For example, the carriers are composed of the following foam (I) and/or (II). Carriers composed of such a resin foam are preferred because their specific gravities or particle sizes are easy to control.

(I) a foam containing a resin component mainly composed of a polyolefin resin and a hydrophilizing agent of a cellulose powder, the resin component constituting 30% to 95% by weight of the foam, the hydrophilizing agent constituting 5% to 70% by weight of the foam, the foam having surface melt fracture (hereinafter also referred to as a "foam (I)"), and (II) a foam containing a resin component mainly composed of a polyolefin resin, a hydrophilizing agent of a cellulose powder, and an inorganic powder, the resin component constituting 30% to 95% by weight of the foam, the hydrophilizing agent constituting 4% to 69% by weight of the foam, the inorganic powder constituting 1% to 30% by weight of the foam, the foam having surface melt fracture (hereinafter also referred to as a "foam (II)").

Melt fracture is generally known as a phenomenon in which a formed product has asperities on its surface (an uneven surface) in the formation of plastics. For example, in extrusion of a plastic material, an excessively high internal pressure of an extruder, an excessively high extrusion speed, or an excessively low temperature of the plastic material may result in irregular asperities on the surface or low surface gloss of the formed product.

Preferred melt fracture of a carrier has a specific surface area ratio represented by the following formula (I):

$$B/A = 1.5 \text{ to } 4.0 \quad (1)$$

A denotes the apparent specific surface area of the foam, and B denotes the actual specific surface area of the foam.

The apparent specific surface area A of the foam refers to a specific surface area of the foam having a smooth surface or having no melt fracture. The actual specific surface area B refers to an actual specific surface area of the foam having melt fracture. The ratio B/A of the formula (I) refers to an increase in specific surface area due to melt fracture. A ratio B/A of 1 indicates that the surface has no asperities due to melt fracture.

A B/A ratio of less than 1.5 results in a small contact area between water to be treated and a carrier and an unfavorably low treatment capacity. A B/A ratio of more than 4.0 unfavorably results in a decrease in surface melt fracture because of contact between carrier particles during use. The apparent specific surface area A and the actual specific surface area B may be measured with an automatic specific surface area/pore distribution analyzer [Tristar 3000, manufactured by Shimadzu Corp.].

The resin component constituting the foam preferably has a melt flow index in the range of 5 to 25 g/10 min. A melt flow index of less than 5 g/10 min results in poor flowability of the resin component, which is unsuitable for the formation of the foam. A melt flow index of more than 25 g/10 min may result in the collapse of the foam during foaming.

The melt flow index (hereinafter sometimes abbreviated as "MFI") is a measure of flowability of molten resin and is generally known as an index represented by the weight of resin flowing out of a nozzle (orifice) having specified dimensions at a given pressure and at a given temperature per 10 minutes (unit: g/10 min). The melt flow index in the present invention is measured at 230° C. at a load of 21.6 N (DIN 53735).

Examples of a preferred resin component constituting the foams (I) and (II) include polyethylene (hereinafter sometimes abbreviated as "PE"), polypropylene (hereinafter sometimes abbreviated as "PP"), and ethylene-vinyl acetate copolymers (hereinafter sometimes abbreviated as "EVA"). These resins may be used alone or in combination. The resin component constituting the foams (I) and (II) may be a polyolefin resin to which another thermoplastic resin component is added. Examples of such another thermoplastic resin component include polystyrene (hereinafter sometimes abbreviated as "PS"), poly(ethylene terephthalate), poly(vinyl chloride), poly(vinylidene chloride), polycarbonate, polyurethane, polyamide, polyacetal, poly(lactic acid), poly (methyl methacrylate), and ABS resin.

The resin component constituting the foams (I) and (II) is particularly preferably polyethylene and, provided that the resin component has a MFI in the range described above, may be a mixture of PE and another polyolefin resin, for example, a mixture of PE and PP, a mixture of PE and EVA, a mixture of PE, PP, and EVA, a mixture of PE, PP, and PS, a mixture of PE, PP, EVA, and PS, or one of these mixtures to which still another thermoplastic resin is added. More specifically, the component ratio (weight ratio) of PE, PP, EVA, and another thermoplastic resin including PS is preferably PE:PP:EVA: another thermoplastic resin including PS=100-60:40-0:20-0: 15-0 per 100 of the entire resin. In order to improve the abrasion resistance of the carrier, EVA preferably constitutes 10% by weight or more of the resin component. The resin component may be recycled resin.

The cellulose powder serving as the hydrophilizing agent may be wood flour, a cellulose powder, or a hemp cellulose powder, for example, sawdust, Avicel, Arbocel, a paper powder, cellulose beads, microcrystalline cellulose, or microfibrillar cellulose and is preferably wood flour. These cellulose powders may be used alone or in combination.

The hydrophilizing agent may be of any shape, including spherical, elliptical, wedge-shaped, whisker-shaped, or fibrous. The particle size of the hydrophilizing agent may be of 200 mesh pass, preferably 100 mesh pass, more preferably 40 mesh pass.

The hydrophilizing agent can impart a water penetration function to a foam having closed cells. To this end, it is desirable that the hydrophilizing agent be exposed on or protrude from a surface of the foam. The term "exposed", as used herein, means that a portion of the surface of the hydrophilizing agent appears on the foam surface. The term "protrude", as used herein, means that a portion of the hydrophilizing agent protrudes from the foam surface. Thus, the term "exposed or protrude", as used herein, means that the hydrophilizing agent is entirely or partly enclosed in the foam, and a portion of the surface of the hydrophilizing agent appears on the foam surface, or a portion of the hydrophilizing agent protrudes from the foam surface.

The inorganic powder for use in the foam (II) may be barium sulfate, calcium carbonate, zeolite, talc, titanium oxide, potassium titanate, or aluminum hydroxide and is preferably barium sulfate. These inorganic powders may be used alone or in combination.

When the percentage of the resin component of the foams (I) and (II) is above the range described above, and the percentage of the hydrophilizing agent is below the range described above, the hydrophilizing agent cannot sufficiently impart the water penetration function, and settling in water takes time. When the percentage of the resin component is below the range described above, and the percentage of the hydrophilizing agent is above the range described above, this results in low carrier strength.

The inorganic powder in the foam (II) serves as a nucleating material for foaming and is used to control specific gravity. The inorganic powder also reduces the amounts of resin component and hydrophilizing agent used and reduces manufacturing costs. When the percentage of the inorganic powder is below the range described above, such effects are insufficient. When the percentage of the inorganic powder is above the range described above, this results in excessively high specific gravity.

As described below, the foams (I) and (II) are formed by foaming using a foaming agent. The foams preferably have an expansion ratio in the range of 2 to 10 and a specific density in the range of 0.10 to 0.80 g/ml as determined from apparent volume.

When the foams (I) and (II) have an expansion ratio below the lower limit, the foams (I) and (II) have an excessively large specific gravity and unfavorably require high power to flow in water. When the foams (I) and (II) have an expansion ratio above the upper limit, the foams (I) and (II) have a small specific gravity and unfavorably float easily on the surface of water.

When the specific density as determined from apparent volume is below or above the lower limit, the settling velocity defined in the present invention is not satisfied in some cases. Specific density as determined from the apparent volume of a foam is determined by measuring an apparent volume of 30 ml of the foam in a 50-ml graduated cylinder and calculating the specific density (unit: g/ml) from the weight of the foam and refers to substantial specific density. This is because the foams (I) and (II) have surface melt fracture, and it is very difficult to measure true volume. Specific density as determined from the apparent volume of a foam is hereinafter referred to simply as "specific density".

The foams (I) and (II) can be manufactured by melt-kneading a polyolefin resin, a hydrophilizing agent, and an inorganic powder, further melt-kneading the mixture and a foaming agent, foaming the resulting mixture, and cutting the foams into foams having a predetermined size.

Examples of the foaming agent include sodium bicarbonate (baking soda) and azodicarbonamide. The foaming agent is not limited to these and may be a chemical foaming agent of a physical foaming agent.

Examples of the chemical foaming agent include azo compounds, such as barium azodicarboxylate, nitroso compounds, such as N,N-dinitrosopentamethylenetetramine, hydrazine derivatives, such as 4,4'-oxybis(benzenesulfonylhydrazide), semicarbazide compounds, azide compounds, triazole compounds, isocyanate compounds, bicarbonates, such as sodium bicarbonate, carbonates, nitrites, hydrides, mixtures of sodium bicarbonate and an acid (for example, sodium bicarbonate and citric acid), mixtures of hydrogen peroxide and an enzyme, and mixtures of a zinc powder and an acid. Examples of the physical foaming agent include aliphatic hydrocarbons (for example, butane, pentane, and hexane), chlorinated hydrocarbons (for example, dichloroethane and dichloromethane), fluorinated chlorinated hydrocarbons (for example, trichloromonofluoromethane, dichlorodifluoromethane, dichloromonofluoromethane, and dichlorotetrafluoroethane), alternative chlorofluorocarbons, air, carbon dioxide, nitrogen gas, and water. Among these, sodium bicarbonate (baking soda) is particularly preferred because of its low decomposition temperature and low price.

The foaming agent may be a self-sustained foaming agent (also referred to as an independent foaming agent, microspheres, or a thermally expandable microcapsule). The self-foaming agent becomes hollow spherical particles having an external wall during foaming. Thus, instead of extruding and foaming a resin composition in water, extruding and foaming the resin composition in a gas phase (for example, in the air) can also produce a foam having a desired expansion ratio while the hollow portions of the foam are retained without collapse. The self-foaming agent may contain a vinylidene chloride-acrylonitrile copolymer or an acrylonitrile-methacrylonitrile copolymer as an external wall polymer and isobutane or isopentane as a volatile liquid enclosed in the external wall polymer. Specific examples of the self-foaming agent include Expancel (Japan Fillite Co., Ltd.) and EPD-03 (Eiwa Chemical Ind. Co., Ltd.). In the present invention, the presence of a hydrophilizing agent of a cellulose powder allows water to penetrate a foam manufactured using a self-foaming agent. Thus, the foam is permeable to water.

These foaming agents may be used alone or in combination. In order to achieve the suitable expansion ratio described above, the amount of foaming agent is preferably in the range of 0.5 to 8 parts by weight per 100 parts by weight of the polyolefin resin and the hydrophilizing agent in the foam (I) or 100 parts by weight of the polyolefin resin, the hydrophilizing agent, and the inorganic powder in the foam (II).

In anaerobic treatment in a reaction vessel charged with a non-biological carrier having a size in the range of 1.0 to 5.0 mm and a settling velocity in the range of 200 to 500 m/h, the carrier rarely floats in large quantities. However, a large load fluctuation may cause fine air bubbles to adhere to the carrier surface, thereby reducing the apparent specific density of the carrier. This causes the carrier to float and flow out of the reaction vessel together with treated water.

In accordance with the first and second inventions, after air bubbles adhering to the carrier floating in the reaction vessel and flowing out of the reaction vessel together with treated water are removed from the carrier to recover the settleability of the carrier, the carrier is returned to the reaction vessel.

Air bubbles may be removed by any method, for example, the following method.

A) Treated water containing a carrier is fed downward through a pipe having a vertical height of 50 cm or more (hereinafter sometimes referred to as a "pipe for removing air bubbles") to remove air bubbles utilizing the drop of a water flow.

B) Treated water containing a carrier is fed through a water tank having a screen to remove air bubbles utilizing a water flow and air bubbles for washing the screen. More specifically, air bubbles can be removed by an aeration flow of an aerator for washing disposed under the screen.

A method using the pipe for removing air bubbles described above in A) is preferred because air bubbles can be efficiently removed with a simple structure.

In the method A), the pipe for removing air bubbles may have a horizontal portion or may be slightly inclined, provided that the pipe has a vertical height of 50 cm or more. In terms of efficiency in the removal of air bubbles, the inclination of the pipe for removing air bubbles relative to the vertical direction is preferably 30 degrees or less, and the pipe is preferably straight without a horizontal portion.

When the pipe for removing air bubbles has an excessively low height, air bubbles are insufficiently removed. When the pipe for removing air bubbles has an excessively high height, this results in excessively large piping. Thus, the pipe for removing air bubbles preferably has a vertical height in the range of 50 to 500 cm, particularly approximately 100 to 200 cm.

When the pipe for removing air bubbles has an excessively small cross-sectional area, it is difficult for treated water containing a carrier to flow smoothly through the pipe. When the pipe for removing air bubbles has an excessively large cross-sectional area, it may be impossible to form a downflow having a significant effect of removing air bubbles through the pipe, resulting in an insufficient effect of removing air bubbles. The cross-sectional area of the pipe depends on the amount of treated water and is preferably in the range of approximately 150 A to 500 A as a nominal diameter. In particular, the cross-sectional area of the pipe is preferably such that the flow rate of treated water containing a carrier is in the range of 0.5 to 3 m/s.

A carrier having a particular size and settling velocity for use in the present invention can recover its settleability by the removal of air bubbles while flowing downward through such a pipe for removing air bubbles. A higher flow rate and settling velocity results in a greater effect of removing air bubbles.

After air bubbles are removed in this manner, the carrier is returned to the reaction vessel. In order to improve water treatment efficiency, preferably, treated water is separated, and then water having a high carrier concentration is returned to the reaction vessel.

More specifically, preferably, treated water containing a carrier free of air bubbles is subjected to solid-liquid separation using a screen or a settling tank (such as a tank having an inclined surface), and treated water having a high carrier concentration is returned to the reaction vessel. A carrier for use in the present invention inherently has a relatively high settling velocity. Thus, after air bubbles are removed from the carrier, the carrier can settle immediately and can be easily concentrated by solid-liquid separation means having a simple structure.

The carrier can be smoothly returned to the reaction vessel by pumping. The carrier may be transferred with a pump of any type. Since the carrier to be transferred is more rigid than sludge, the carrier can be returned with a pump for transferring water containing granular solid.

Treatment, such as removal of air bubbles, solid-liquid separation, or pumping, of granules of granular sludge can cause problems of disintegration and dispersion of the granules. Non-biological carriers can be subjected to removal of air bubbles, solid-liquid separation, and pumping without causing such problems.

In order to smoothly pump treated water containing a carrier while limiting the amount of treated water returned to the reaction vessel, the carrier concentration of water to be returned to the reaction vessel is preferably in the range of 1% to 30% by volume.

Water to be treated in the first and second inventions may have any composition or concentration, provided that the water to be treated is a liquid that contains an organic substance that can be treated by anaerobic treatment involving contact with an anaerobic microorganism.

The COD concentration of water to be treated is not particularly limited. As described above, anaerobic treatment using a carrier has particularly excellent effects on the treatment of low-concentration wastewater, to which it is difficult to apply treatment using granules, such as the UASB method or the EGSB method. Thus, the first and second inventions are effective for treatment of low-concentration wastewater having a $COD_{Cr}$ concentration of 2000 mg/L or less, for example, 500 to 2000 mg/L.

Examples of such wastewater include, but are not limited to, wastewater from food-processing plants, organic wastewater from chemical plants, and general sewage.

When water to be treated contains a polymer component, such as a sugar or a protein, an acid production vessel for decomposing the polymer into a low-molecular organic acid, such as acetic acid or propionic acid, may be installed as pretreatment means for a reaction vessel charged with a fluid non-biological carrier, as in an anaerobic treatment apparatus illustrated below in FIG. 1.

The treatment conditions in the acid production vessel depend on the conditions, such as biodegradability, of water to be treated and suitably include pH in the range of 5 to 8, preferably 5.5 to 7.0, a temperature in the range of 20° C. to 40° C., preferably 25° C. to 35° C., and HRT in the range of 2 to 24 h, preferably 2 to 8 h.

A sufficient reduction in molecular weight in such an acid production vessel facilitates treatment in the downstream reaction vessel charged with a fluid non-biological carrier.

Wastewater containing only a compound that a methanogen can directly use, such as methanol or acetic acid, requires no acid production vessel, and the water to be treated can be directly supplied to the reaction vessel charged with a fluid non-biological carrier.

The reaction vessel charged with a fluid non-biological carrier to which water to be treated is supplied may be a complete mixing reaction vessel having an agitator or an upflow reaction vessel in which mixing is performed with a water flow and generated gas. In particular, an upflow reaction vessel is preferred because the height and shape of the reaction vessel can be flexibly designed and because a large amount of carrier can be charged. As described above, a method using a carrier does not require a gas-solid-liquid separation mechanism (GSS), which is required for granule methods. For example, even with an upflow reaction vessel having a depth of approximately 5 m, high-load treatment at a vessel loading in the range of 15 to 20 kg-$COD_{Cr}$/m³/day or more is possible.

The treatment conditions in a continuous stirred reaction vessel or an upflow reaction vessel are not particularly limited, provided that desired treatment efficiency can be achieved. For example, the treatment conditions may be as described below.

<Continuous Stirred Reaction Vessel>
  Carrier filling rate: 10% to 30%
  HRT: 1.0 to 24 h
  Vessel loading: 4.0 to 12.0 kg-$COD_{Cr}$/m³/day
  Sludge loading: 0.8 to 3.0 kg-$COD_{Cr}$/kg-VSS/day
  pH: 6.5 to 7.5
  Temperature: 25° C. to 38° C.
<Upflow Reaction Vessel>
  Carrier filling rate: 10% to 80%
  HRT: 1.0 to 24 h
  Upflow rate (LV): 1.0 to 20 m/h
  Vessel loading: 4.0 to 32 kg-$COD_{Cr}$/m³/day
  Sludge loading: 0.8 to 3.0 kg-$COD_{Cr}$/kg-VSS/day
  pH: 6.5 to 7.5
  Temperature: 25° C. to 38° C.

An anaerobic treatment apparatus according to an embodiment of the first invention will be described below with reference to FIG. 1. However, an anaerobic treatment apparatus according to the first invention is not limited to the anaerobic treatment apparatus illustrated in FIG. 1.

In this anaerobic treatment apparatus, water to be treated (raw water) is treated in an acid production vessel 1 and is transferred to a pH control vessel 2 to control pH. The pH-controlled water is fed upward to a reaction vessel 3 charged with a fluid non-biological carrier 4 through a pump $P_1$ and is treated. An outlet pipe 5A for drawing treated water in the reaction vessel 3 together with a floating carrier is disposed on an upper side wall of the reaction vessel 3. The outlet pipe 5A is connected to a pipe for removing air bubbles 5 in the vertical direction. The pipe for removing air bubbles 5 has a vertical height of 50 cm or more.

The pipe for removing air bubbles 5 has an outlet in a treated water vessel 6 having an inclined bottom. 6A denotes a screen. The treated water containing the floating carrier flowing out of the reaction vessel 3 flows through the outlet pipe 5A, flows downward through the pipe for removing air bubbles 5, and is transferred to the treated water vessel 6 having the screen 6A. The pipe for removing air bubbles 5 removes air bubbles adhering to the carrier in the treated water flowing out of the reaction vessel 3 to recover the settleability of the carrier. Thus, the carrier settles rapidly in the treated water vessel 6. Part of water passing through the screen 6A of the treated water vessel 6 is discharged to the outside of the system as treated water. The remainder circulates through the acid production vessel 1. A settled carrier in the treated water vessel 6 is returned to the reaction vessel 3 together with treated water through a pump $P_2$. 1A and 2A denote pH meters. Although the screen 6A is disposed within the treated water vessel 6 in FIG. 1, a screen box (not shown) may be disposed at some point along the outlet pipe 5A to separate the carrier and return the carrier to the reaction vessel 3, thereby omitting the treated water vessel.

Embodiments of the third invention will be described in detail below.

A method for treating organic wastewater according to the third invention includes supplying wastewater containing an organic substance to a reaction vessel containing a non-biological carrier to biologically treat the wastewater with an anaerobic microorganism adhering to the non-biological carrier. At the startup of the reaction vessel, the organic wastewater begins to be supplied to the reaction vessel containing the non-biological carrier and methanogen granules, the volume ratio of the non-biological carrier to the methanogen granules being in the range of 100:5 to 100:500, and the organic wastewater is continuously supplied to decompose and disperse at least some of the methanogen granules in the reaction vessel.

The third invention includes supplying methanogen granules as seed sludge to a reaction vessel charged with a non-biological carrier to start up the reaction vessel.

While continuing the operation, the methanogen granules gradually grow or decompose and flow out of the reaction vessel after flotation, dispersion, and/or decomposition. In the early stages of the startup, however, the methanogen granules decompose COD components in the organic wastewater and, as seed sludge, promote the adhesion of the microorganism to the carrier surface to form an active biofilm.

In the third invention, the COD concentration of the organic wastewater to be treated is not particularly limited, provided that the organic wastewater contains an organic substance that can be treated with the anaerobic microorganism. For high-concentration wastewater (having a $COD_{Cr}$ concentration of more than approximately 2000 mg/L), the residence time in the reaction vessel can be increased, and some dispersed bacteria can be held in the reaction vessel. Thus, the addition of the methanogen granules as seed sludge has a little effect of promoting the adhesion of the biofilm to the carrier.

In contrast, for low-concentration wastewater (having a $COD_{Cr}$ concentration of approximately 2000 mg/L or less), high-load treatment requires a short residence time in the reaction vessel, and dispersed bacteria cannot be held in the reaction vessel. In this case, use of the methanogen granules as seed sludge according to the present invention can significantly reduce the startup time.

Thus, the third invention is effective for treatment of low-concentration wastewater having a $COD_{Cr}$ concentration of 2000 mg/L or less, for example, approximately 500 to 2000 mg/L.

Examples of such wastewater include, but are not limited to, wastewater from food-processing plants, organic wastewater from chemical plants, and general sewage.

The methanogen granules supplied to the reaction vessel as seed sludge is sludge of settling granules formed by self-granulation of an anaerobic microorganism in sludge containing the anaerobic microorganism and may be granules generally formed in the UASB and EGSB methods. Methanogen granules contain high concentrations of an acidogenic bacterium that produces an organic acid from a high-molecular compound and a methanogen that produces methane gas from acetic acid or hydrogen. The bacterial cell concentration of the sludge is in the range of 50 to 100 g-VSS/L, which is higher than that of dispersed sludge. Such a high bacterial cell concentration can advantageously reduce facilities and costs for transferring methanogen granules.

The average particle size of methanogen granules used as seed sludge is in the range of 0.5 to 3.0 mm, particularly approximately 0.8 to 2.5 mm. For example, when a fluid carrier described below is used as a carrier, the average particle size of methanogen granules is preferably approximately 0.1 to 0.6 times the average particle size of the carrier.

In the third invention, such methanogen granules are used at a volume ratio of the non-biological carrier to the methanogen granules in the range of 100:5 to 100:500, preferably at a volume ratio of the methanogen granules to the non-biological carrier in the range of 0.05 to 2.0, particularly 0.1 to 1.0. A number of methanogen granules smaller than this range results in insufficient advantages of the present invention using methanogen granules. A number of methanogen granules larger than this range results in a high filling rate of the reaction vessel and an increase in the outflow of the granules. In order to reduce the outflow of the granules, the volume of the reaction vessel must unfavorably be increased.

The third invention includes supplying organic wastewater (raw water) to a reaction vessel containing a non-biological carrier and methanogen granules at the startup to bring the organic wastewater into contact with the methanogen granules and the carrier, thereby performing anaerobic treatment. The treatment method is not particularly limited. A method for feeding raw water upward to a reaction vessel to spread a non-biological carrier and methanogen granules and form a sludge blanket in the same manner as the UASB method and the EGSB method is preferred because this method can increase the contact efficiency between the raw water, the methanogen granules, and the carriers.

The methanogen granules in the reaction vessel have only to contribute to the decomposition of COD components in the reaction vessel for a short period of time in the startup and thereby allow higher-load operation than common granule methods. For example, the sludge loading may be as high as 0.8 to 3.0 kg-$COD_{Cr}$/kg-VSS/day. It is generally known that such high-load conditions cause decomposition and dispersion of granules and make it impossible to hold the granules in the reaction vessel. In the present invention, however, during decomposition and dispersion of granules, the formation of a biofilm on the carrier is promoted, and active dispersed bacteria spread over the carrier surface. After that, the microorganism-loaded carrier on which the active biofilm has been formed can perform efficient treatment and obviate the necessity for preventing the decomposition and dispersion of granules.

In this case, the fluid carrier used is preferably, but not limited to, a resin carrier, for example, a polyolefin resin carrier or a polyurethane resin carrier because the surface area of the resin carrier can be increased by foaming and the specific gravity of the resin carrier is easy to control. The average particle size of the carrier is preferably in the range of 1 to 5 mm, particularly 2 to 4 mm.

The particle size of the carrier, for example, the particle size of a cubic carrier refers to the length of one side. The particle size of a rectangular parallelepiped carrier refers to the length of the longest side of the carrier. The particle size of a cylindrical carrier refers to the larger one of the height and the diameter of the cylinder. The particle size of a carrier of an irregular shape other than these shapes refers to the largest distance between two parallel plates disposed on the top and bottom of the carrier.

The upflow rate of raw water to the reaction vessel is preferably in the range of 3 to 20 m/h, particularly 2 to 5 m/h, in terms of treatment efficiency and COD decomposition efficiency.

As described above, the organic substance concentration of raw water is preferably in the range of $COD_{Cr}$ 500 to 2000 mg/L, and the reaction vessel load is preferably in the range of 5 to 30 kg-$COD_{Cr}$/m$^3$/day, particularly 8 to 20 kg-$COD_{Cr}$/m$^3$/day. The internal temperature of the reaction vessel is preferably in the range of 25° C. to 40° C., particularly 30° C. to 38° C. Influent water to the reaction vessel preferably has a pH in the range of approximately 6.5 to 7.5. If necessary, therefore, raw water is preferably supplied to the reaction vessel after pH control.

EXAMPLES

The first invention will be more specifically described in the following Example 1 and Comparative Examples 1 and 2.

Example 1 and Comparative Examples 1 and 2

Figure 1:
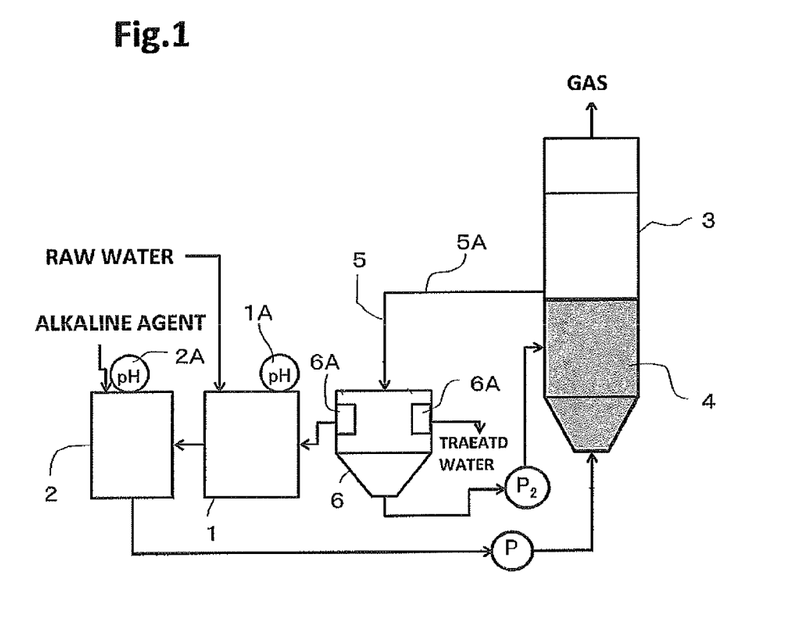
FIG. 1 is a system diagram of an anaerobic treatment apparatus according to an embodiment of the present invention.

Synthetic wastewater mainly composed of a sugar and a protein ($COD_{Cr}$ concentration: 2000 mg/L, pH 7.0) was supplied as raw water to an anaerobic treatment apparatus illustrated in FIG. 1.

In this anaerobic treatment apparatus, raw water is treated in an acid production vessel 1 and is transferred to a pH control vessel (volume 0.5 L) 2 to control pH. The pH-controlled water is fed upward to a reaction vessel 3 charged with a fluid non-biological carrier 4 through a pump $P_1$ and is treated. Water flowing out of the reaction vessel 3 flows downward through a pipe for removing air bubbles 5 and is transferred into a treated water vessel 6 having a screen 6A. Treated water flows out of the reaction vessel 3 together with a carrier floating in the reaction vessel 3. Air bubbles adhering to the carrier in the effluent water are removed through the pipe for removing air bubbles 5, thereby recovering the settleability of the carrier. Thus, the carrier settles rapidly in the treated water vessel 6. Part of water passing through the screen 6A of the treated water vessel 6 is discharged to the outside of the system as treated water. The remainder circulates through the acid production vessel 1. A settled carrier in the treated water vessel 6 is returned to the reaction vessel 4 together with treated water through a pump $P_2$.

The following are treatment conditions in the acid production vessel 1 and the reaction vessel 3.

<Acid Production Vessel>
 Volume: 200 L
 HRT: 2.0 h
 pH: 6.5
 Temperature: 30° C.

<Reaction Vessel>
 Volume: approximately 400 L
 HRT: 6.0 h
 Upflow rate (LV): 10 m/h
 pH: 7.0
 Carrier filling rate: 40%

The following are specifications and conditions of the pipe for removing air bubbles 5.

<Pipe for Removing Air Bubbles>
 Height (vertical length): 50 cm
 Diameter: 15 cm
 Cross-sectional area: 177 cm$^2$
 Flow rate in pipe for removing air bubbles (LV): 1.0 m/h The carrier concentration of treated water returning from the treated water vessel 6 to the reaction vessel 4 was in the range of 1.0% to 10.0%.

The carrier to be charged in the reaction vessel was a polyolefin resin carrier having a size (a height of a cylinder) and a settling velocity shown in Table 1. At the beginning of treatment, the reaction vessel 3 was charged with dispersed anaerobic sludge as seed sludge. Upon initiating the supply of raw water, the $COD_{Cr}$ concentration of treated water was measured. The load was gradually increased under conditions where the $COD_{Cr}$ concentration of treated water was 200 mg/L or less.

Table 1 shows the treatment results.

TABLE 1

| | Carrier used | | |
|---|---|---|---|
| | Size (mm) | Settling velocity (m/hr) | Treatment results |
| Example 1 | 3 | 250 | During operation, the amount of carrier floating in the reaction vessel 3 was almost constant in the range of 1 to 2 L/day. After air bubbles were removed, the carrier was returned to the reaction vessel 3 through the pump $P_2$. This increased the total treatment capacity to 15 kg-CODCr/m$^3$/day and allowed stable treatment. |

TABLE 1-continued

| | Carrier used | | Treatment results |
|---|---|---|---|
| | Size (mm) | Settling velocity (m/hr) | |
| Comparative example 1 | 3 | 150 | The carrier flowing out of the reaction vessel 3 was successfully collected and returned. During operation, the amount of carrier floating in the reaction vessel 3 was not reduced, and 10 to 20 L/day of the carrier flowed out of the reaction vessel 3. After air bubbles were removed, the carrier was returned to the reaction vessel 3 through the pump $P_2$. A biofilm was detached from the carrier because of mechanical friction. The total treatment capacity was only approximately 5 kg-CODCr/m$^3$/day. |
| Comparative example 2 | 3 | 550 | During operation, the amount of carrier floating in the reaction vessel 3 was almost constant in the range of 1 to 2 L/day. After air bubbles were removed, the carrier was returned to the reaction vessel 3 through the pump $P_2$. However, while continuing the operation, the carrier in the reaction vessel 3 floated as aggregates, and the operation could not be continued. It is supposed that an insufficient flow of the carrier resulted in the growth and adhesion of the biofilm. |

These results show that in anaerobic treatment using a non-biological carrier according to the first invention, even when fine air bubbles adhere to and float the carrier and thereby cause the floating carrier to flow out of a reaction vessel, stable high-load treatment can be performed by using a non-biological carrier having a particular size and settling velocity, removing air bubbles adhering to the surface of the carrier flowing out of the reaction vessel to settle the carrier, and returning the carrier to the reaction vessel through a pump after removing treated water.

The second invention will be more specifically described in the following Examples 2 to 4 and Comparative Examples 3 to 5.

Figure 2:
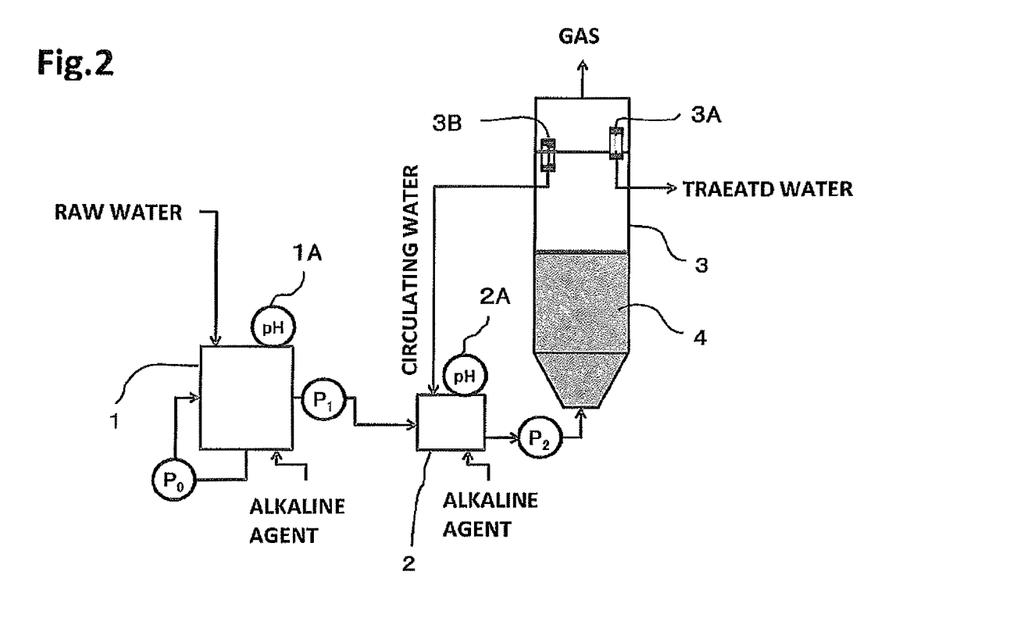
FIG. 2 is a system diagram of an anaerobic treatment apparatus used in an example of the second invention.

Table 2 shows the specifications of fluid non-biological carriers used in the following Examples 2 to 4 and Comparative Examples 3 to 5. A polyolefin resin serving as a component of a foam was polyethylene (MFI 15 g/10 min). Elliptical wood flour of 100 mesh pass was used as a hydrophilizing agent. Barium sulfate was used as an inorganic powder. The carriers were cylindrical, and the carrier size refers to the height of the cylinder.

with a fluid non-biological carrier 4 through a pump $P_2$ and is treated. Part of water flowing out of the reaction vessel 3 is circulated as circulating water through the pH control vessel 2. The remainder is discharged to the outside of the system as treated water. Water in the acid production vessel 1 is circulated through a pump $P_0$. An alkaline agent sodium hydroxide is supplied to the acid production vessel 1 and the pH control vessel 2 to control pH. 1A and 2A denote pH meters, and 3A and 3B denote screens.

The following are treatment conditions in the acid production vessel 1 and the reaction vessel 3.

<Acid Production Vessel>
Volume: 6.7 L
HRT: 2 h
pH: 6.5
Temperature: 30° C.
<Reaction Vessel>
Volume: approximately 10 L (diameter 15 cm, height 60 cm)
HRT: 3 h
Upflow rate (LV): 10 m/h

TABLE 2

| | Carrier No. | Raw materials of foam (% by weight) | | | Melt fracture (A/B ratio) | Apparent specific gravity (g/ml) | Size (mm) | Settling velocity (m/hr) |
|---|---|---|---|---|---|---|---|---|
| | | Polyolefin resin | Hydrophilizing agent | Inorganic powder | | | | |
| Carriers in Examples | A-1 | 50 | 40 | 10 | 3.5 | 0.35 | 4 | 200 |
| | A-2 | 80 | 10 | 10 | 3.5 | 0.45 | 4 | 500 |
| | A-3 | 80 | 20 | 0 | 3.5 | 0.40 | 4 | 300 |
| Carriers in Comparative Examples | B-1 | 50 | 50 | 0 | 3.5 | 0.25 | 4 | 150 |
| | B-2 | 70 | 10 | 20 | 3.5 | 0.65 | 4 | 600 |
| | B-3 | 80 | 10 | 10 | 1.0 | 0.45 | 4 | 500 |

Examples 2 to 4 and Comparative Examples 3 to 5

Synthetic wastewater mainly composed of a sugar and an organic acid ($COD_{Cr}$ concentration: 2000 mg/L, glucose: 1000 mg-$COD_{Cr}$/L, acetic acid: 1000 mg-$COD_{Cr}$/L, pH 7.0) was supplied as raw water to an anaerobic treatment apparatus illustrated in FIG. 2.

In this anaerobic treatment apparatus, raw water is treated in an acid production vessel 1 and is transferred to a pH control vessel 2 through a pump $P_1$ to control pH. The pH-controlled water is fed upward to a reaction vessel 3 charged pH: 7.0
Carrier filling rate: 40%

The amount of water to be treated was approximately 80.4 L/day (influent $COD_{Cr}$: approximately 160.8 g/day). At the beginning of treatment, 2 L of dispersed anaerobic sludge (10 g-VSS/L) was supplied to the reaction vessel 3 as seed sludge.

In Examples 2 to 4 and Comparative Examples 3 to 5, treatment was performed in the same manner except that the reaction vessel 3 was charged with a carrier listed in Table 3. Table 3 lists the treatment capacity, the $COD_{Cr}$ reduction rate, and the state of the carrier in the reaction vessel 3.

TABLE 3

| | Carrier No. | Treatment capacity (vessel loading) (g-$COD_{Cr}$/L/day) | | $COD_{Cr}$ reduction rate (%) | | | State of carrier |
|---|---|---|---|---|---|---|---|
| | | Acid production vessel | Reaction vessel | Acid production vessel | Reaction vessel | Total | |
| Example 2 | A-1 | 6.0 | 8.8 | 25 | 55 | 80 | Operated without flotation or blockage. |
| Example 3 | A-2 | 6.7 | 8.5 | 28 | 53 | 81 | Operated without flotation or blockage. |
| Example 4 | A-3 | 6.2 | 8.8 | 26 | 55 | 81 | Operated without flotation or blockage. |
| Comparative example 3 | B-1 | 6.0 | 8.0 | 25 | 50 | 75 | A floating carrier formed scum and caused blockage. |
| Comparative example 4 | B-2 | 6.2 | 9.6 | 26 | 60 | 86 | A biofilm was deposited in the vicinity of a wastewater inlet and caused blockage, thereby stopping stable operation. |
| Comparative example 5 | B-3 | 6.0 | 2.9 | 25 | 18 | 43 | A biofilm was insufficiently formed on a carrier, resulting in low removal capacity. |

Table 3 shows that anaerobic treatment using a fluid non-biological carrier according to the second invention is stable high-load treatment without blockage caused by the flotation and adhesion of the carrier.

The third invention will be more specifically described in the following example and comparative example.

Example 5

Figure 3:
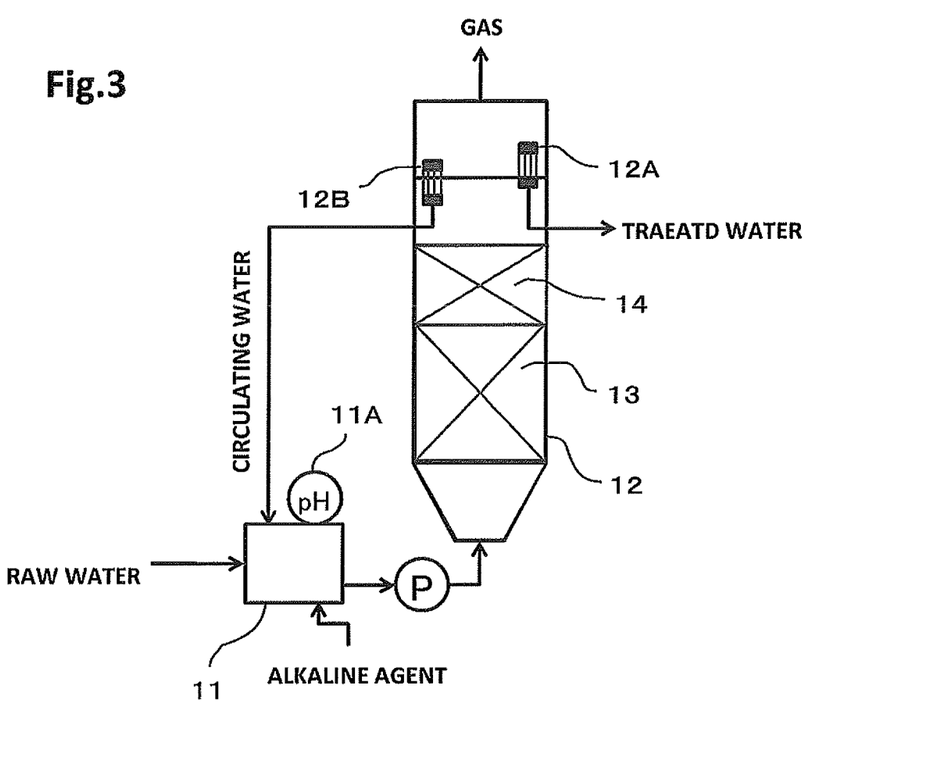
FIG. 3 is a system diagram of a biological treatment apparatus used in Example 5.

Synthetic wastewater mainly composed of a sugar ($COD_{Cr}$ concentration 1000 mg/L (COD components: sugar 60% by weight, protein 20% by weight, and ethanol 20% by weight), pH 6.8) was treated as raw water in a biological treatment apparatus illustrated in FIG. 3.

In the biological treatment apparatus, raw water is introduced into a pH control vessel 11 to control pH and is fed upward to a reaction vessel 12 through a pump P. Part of water flowing out of the reaction vessel 12 is circulated as circulating water through the pH control vessel 11. The remainder is discharged to the outside of the system as treated water. 11A denotes a pH meter, and 12A and 12B denote screens.

At the startup, a reaction vessel (volume 10 L, diameter 15 cm, height approximately 65 cm) 12 was charged with 4 L of a polyolefin resin carrier (cylindrical, diameter 2 mm, length in the range of 3 to 4 mm) and 0.5 L of methanogen granules (sludge concentration 60 g-VSS/L, average particle size 2.3 mm) as seed sludge. The pH of raw water was adjusted to 7.0 in the pH control vessel 11 with an alkaline agent sodium hydroxide. Raw water was then fed upward to the reaction vessel 12 through the pump P under the following conditions.
<Water Flow Conditions>
  HRT: 2 h
  Upflow rate (LV): 3 m/h
  Circulating water flow rate: 890 mL/min
  Temperature: 30° C.

As a result, the treatment capacity (load) reached 10 kg-$COD_{Cr}$/m$^3$/day (sludge loading 1.3 kg-$COD_{Cr}$/kg-VSS/day) within few days after the startup. At that point, no biofilm was formed on the carrier in the reaction vessel 12. Thus, the treatment was performed with the seed sludge. After that, the methanogen granules added as seed sludge were gradually decomposed and dispersed and flowed out of the reaction vessel during approximately 60 days of operation. The treatment was performed with a biofilm formed on the carrier surface instead of the methanogen granules.

Figure 4:
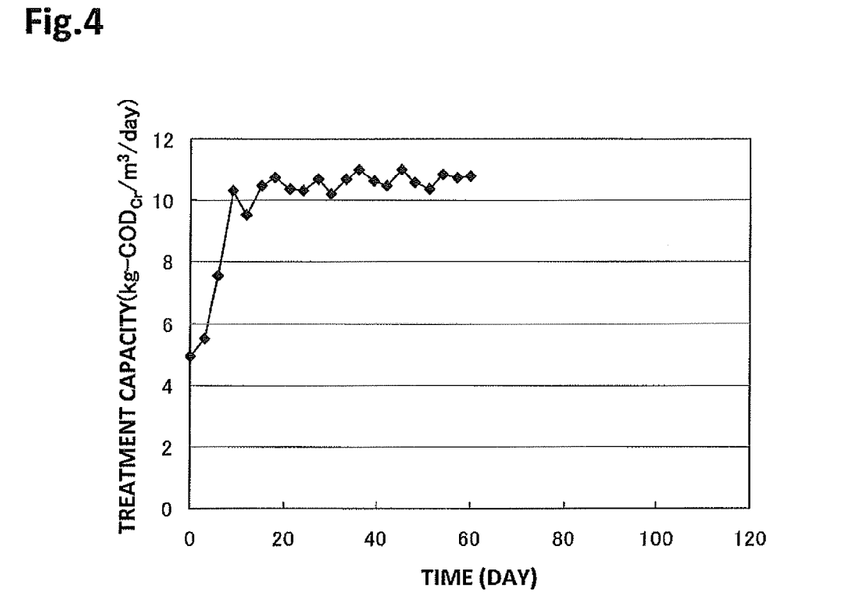
FIG. 4 is a graph of treatment capacity as a function of time in Example 5.
Figure 5:
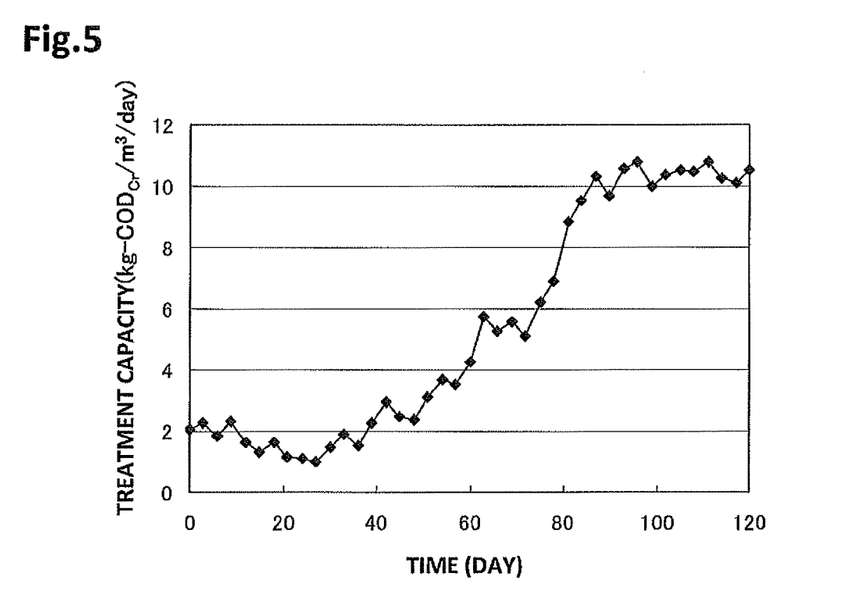
FIG. 5 is a graph of treatment capacity as a function of time in Comparative Example 6.

FIG. 4 shows treatment capacity as a function of time in Example 5.

Comparative Example 6

The synthetic wastewater was treated in the same manner as in Example 5 except that 6 L of dispersed anaerobic sludge (digested sludge of sewage, sludge concentration 40 g-VSS/L) was added as seed sludge at the startup instead of the methanogen granules.

As a result, the dispersed sludge added as seed sludge entirely flowed out within few days after the startup. A biofilm was formed on the carrier surface by a very small number of microorganisms adhering to the carrier. A treatment capacity (load) of 10 kg-$COD_{Cr}$/m$^3$/day required approximately 90 days of operation.

FIG. 4 shows treatment capacity as a function of time in Comparative Example 6.

The results in Example 5 and Comparative Example 6 show that the present invention using methanogen granules as seed sludge instead of existing dispersed sludge in anaerobic treatment using a non-biological carrier has high treatment capacity in the early stages of the startup even in the treatment of low-concentration wastewater and can subsequently perform stable high-load operation using an active biofilm formed on the carrier surface.

Although the present invention has been described in detail with reference to particular embodiments, it is apparent to a person skilled in the art that various modifications can be made therein without departing from the spirit and scope of the present invention.

The present application is based on Japanese Patent Application (Japanese Patent Application No. 2010-261349) filed on Nov. 24, 2010, Japanese Patent Application (Japanese Patent Application No. 2010-261353) filed on Nov. 24, 2010, and Japanese Patent Application (Japanese Patent Application No. 2010-262504) filed on Nov. 25, 2010, which are incorporated herein by reference in their entirety.

1 Acid production vessel
  2 pH control vessel
  3 Reaction vessel
  4 Fluid non-biological carrier
  5 Pipe for removing air bubbles
  6 Treated water vessel
  11 pH control vessel
  12 Reaction vessel
  13 Fluid non-biological carrier
  14 Methanogen granules

The invention claimed is:
1. An anaerobic treatment method, comprising: supplying water to be treated to a reaction vessel charged with a fluid non-biological carrier under anaerobic conditions to form a biofilm on a surface of the non-biological carrier, thereby treating the water to be treated,
  wherein the reaction vessel is charged with a non-biological carrier having a size in the range of 1.0 to 5.0 mm and a settling velocity in the range of 200 to 500 m/h, and
  the carrier contained in treated water flowing out of the reaction vessel is returned to the reaction vessel after air bubbles adhering to the carrier are removed.

2. The anaerobic treatment method according to claim 1, wherein treated water containing the carrier flowing out of the reaction vessel is fed downward through a pipe having a vertical height of 50 cm or more so as to remove air bubbles adhering to the carrier.

3. The anaerobic treatment method according to claim 1, wherein the carrier from which the air bubbles have been removed is separated from treated water with a screen or a settling tank and is returned to the reaction vessel through a pump.

4. An anaerobic treatment apparatus for supplying water to be treated to a reaction vessel charged with a fluid non-biological carrier under anaerobic conditions to form a biofilm on a surface of the non-biological carrier, thereby treating the water to be treated,
  wherein the carrier charged into the reaction vessel has a size in the range of 1.0 to 5.0 mm and a settling velocity in the range of 200 to 500 m/h, and
  the anaerobic treatment apparatus has means for removing air bubbles adhering to the carrier contained in treated water flowing out of the reaction vessel and means for returning the carrier to the reaction vessel after the air bubbles have been removed.

5. The anaerobic treatment apparatus according to claim 4, wherein the means for removing air bubbles adhering to the carrier is a pipe having a vertical height of 50 cm or more through which treated water containing the carrier flowing out of the reaction vessel flows downward.

6. The anaerobic treatment apparatus according to claim 4, wherein the means for returning the carrier to the reaction vessel after the air bubbles have been removed includes a screen or a settling tank for separating treated water from the carrier from which the air bubbles have been removed and a pump for returning the carrier that has passed through the screen or the settling tank to the reaction vessel.

7. An anaerobic treatment method, comprising: supplying water to be treated to a reaction vessel charged with a fluid non-biological carrier under anaerobic conditions to form a biofilm on a surface of the non-biological carrier, thereby treating the water to be treated,
  wherein the non-biological carrier is formed of the following foam (I) and/or (II), and the carrier has a size in the range of 1.0 to 5.0 mm and a settling velocity in the range of 200 to 500 m/h:
  (I) a foam containing a resin component mainly composed of a polyolefin resin and a hydrophilizing agent of a cellulose powder, the resin component constituting 30% to 95% by weight of the foam, the hydrophilizing agent constituting 5% to 70% by weight of the foam, the foam having surface melt fracture, and
  (II) a foam containing a resin component mainly composed of a polyolefin resin, a hydrophilizing agent of a cellulose powder, and an inorganic powder, the resin component constituting 30% to 95% by weight of the foam, the hydrophilizing agent constituting 4% to 69% by weight of the foam, the inorganic powder constituting 1% to 30% by weight of the foam, the foam having surface melt fracture.

8. The anaerobic treatment method according to claim 7, wherein the surface melt fracture of the foam has a specific surface area ratio represented by the following formula (1):

$$B/A = 1.5 \text{ to } 4.0 \qquad (1)$$

wherein A denotes the apparent specific surface area of the foam, and B denotes the actual specific surface area of the foam.

9. The anaerobic treatment method according to claim 7, wherein the hydrophilizing agent is exposed on or protrudes from a surface of the foam.

10. The anaerobic treatment method according to claim 7, wherein the resin component has a melt flow index in the range of 5 to 25 g/10 min.

11. The anaerobic treatment method according to claim 10, wherein the resin component is polyethylene or a mixture of polyethylene and one or two or more selected from the group consisting of polypropylene, polystyrene, and ethylene-vinyl acetate copolymers.

12. The anaerobic treatment method according to claim 7, wherein the foam has an expansion ratio in the range of 2 to 10 and a specific density in the range of 0.10 to 0.80 g/ml as determined from apparent volume.

13. The anaerobic treatment method according to claim 7, wherein the reaction vessel is an upflow reaction vessel.

14. An anaerobic treatment apparatus for supplying water to be treated to a reaction vessel charged with a fluid non-biological carrier under anaerobic conditions to form a biofilm on a surface of the non-biological carrier, thereby treating the water to be treated,
  wherein the non-biological carrier is formed of the following foam (I) and/or (II), and the carrier has a size in the range of 1.0 to 5.0 mm and a settling velocity in the range of 200 to 500 m/h:
  (I) a foam containing a resin component mainly composed of a polyolefin resin and a hydrophilizing agent of a cellulose powder, the resin component constituting 30% to 95% by weight of the foam, the hydrophilizing agent constituting 5% to 70% by weight of the foam, the foam having surface melt fracture, and
  (II) a foam containing a resin component mainly composed of a polyolefin resin, a hydrophilizing agent of a cellulose powder, and an inorganic powder, the resin component constituting 30% to 95% by weight of the foam, the hydrophilizing agent constituting 4% to 69% by weight of the foam, the inorganic powder constituting 1% to 30% by weight of the foam, the foam having surface melt fracture.

15. A method for treating organic wastewater, comprising: supplying wastewater containing an organic substance to a reaction vessel containing a non-biological carrier to biologically treat the wastewater with an anaerobic microorganism adhering to the non-biological carrier, wherein at the startup of the reaction vessel the organic wastewater begins to be supplied to the reaction vessel containing the non-biological carrier and methanogen granules, the volume ratio of the non-biological carrier to the methanogen granules being in the range of 100:5 to 100:500, and the organic wastewater is continuously supplied to decompose and disperse at least some of the methanogen granules in the reaction vessel.

16. The method for treating organic wastewater according to claim 15, wherein the organic wastewater has an organic substance concentration of 2000 mg-$COD_{Cr}$/L or less.

17. The method for treating organic wastewater according to claim 15, wherein the reaction vessel is a fluidized bed reaction vessel, and the organic wastewater is fed upward to the reaction vessel.

18. The method for treating organic wastewater according to claim 15 wherein the reaction vessel has a sludge loading in the range of 0.8 to 3.0 kg-$COD_{Cr}$/kg-VSS/day.

\* \* \* \* \*